United States Patent [19]

Stove

[11] Patent Number: 5,341,144
[45] Date of Patent: Aug. 23, 1994

[54] VEHICULAR CRUISE CONTROL SYSTEM AND RADAR SYSTEM THEREFOR

[75] Inventor: Andrew G. Stove, Reigate, England

[73] Assignee: U.S. Philips Corporation, New York, N.Y.

[21] Appl. No.: 60,385

[22] Filed: May 7, 1993

[30] Foreign Application Priority Data

May 8, 1992 [GB] United Kingdom ............... 9209974

[51] Int. Cl.⁵ .............................................. G01S 13/00
[52] U.S. Cl. ........................................ 342/70; 342/71; 342/84
[58] Field of Search ................ 342/70, 71, 84, 85, 342/87, 128, 129

[56] References Cited

U.S. PATENT DOCUMENTS

| | | |
|---|---|---|
| 3,710,383 | 1/1973 | Cherry et al. |
| 4,200,872 | 4/1980 | Sifferlen et al. ............... 343/7.5 |
| 4,205,314 | 5/1980 | Strauch ........................ 343/7.5 X |
| 4,241,347 | 12/1980 | Albanese et al. ............... 342/128 |
| 4,302,758 | 11/1981 | Tomasi ........................ 342/128 |
| 4,388,622 | 6/1983 | Fletcher, Jr. ................. 342/128 |
| 4,404,562 | 9/1983 | Kretschmer, Jr. et al. ...... 342/129 |
| 4,578,677 | 3/1986 | Lewis .......................... 342/128 |
| 4,916,450 | 4/1990 | Davis .......................... 342/71 |
| 5,165,497 | 11/1992 | Chi ............................. 342/71 X |
| 5,181,037 | 1/1993 | Komatsu ....................... 342/128 X |

*Primary Examiner*—Mark Hellner
*Attorney, Agent, or Firm*—Robert J. Kraus

[57] ABSTRACT

A radar system (30) for determining the range at a future time of a target moving relative to the radar system. The system comprises an R.F. source (56) for providing a signal at a frequency which increases over time from a base frequency f (Hz) at a rate r (Hz/s) for a sweep duration d (s). This signal is transmitted and a signal reflected by the target is mixed (38) with a portion of the transmitted signal to give a signal having a frequency proportional to the range of the target. The R.F. source is arranged to have a sweep rate r equal to the base frequency f divided by a time t (s) which time is the delay until the target will be at the measured range. A predicted range may thus be derived without complex compensation for relative velocity. The system may further provide velocity feedback without requiring extra circuitry.

5 Claims, 1 Drawing Sheet ns due to the range of the target will alter in polarity with the direction of frequency sweep. The frequency shifts due to target range and the Doppler effect respectively can thus be distinguished. However, the use of a bi-directional frequency sweep in this manner increases the possibility of confusion between multiple targets.

VEHICULAR CRUISE CONTROL SYSTEM AND RADAR SYSTEM THEREFOR

BACKGROUND OF THE INVENTION

The present invention relates to a radar system having particular, but not exclusive, application to a continuous wave radar system for predicting a range value for an intelligent cruise control in a vehicle.

Frequency Modulated Continuous Wave (FMCW) radar systems are popular because they are simple and require a lower peak power output than their pulse counterparts. U.S. Pat. No. 3,710,383 (Cherry et al.) describes an FMCW radar system used to provide a range input to a headway control system for a motor vehicle. A modulated carrier wave is transmitted towards the vehicle ahead and a reflected wave is received. The range of the vehicle ahead is determined from the frequency difference or beat frequency between the instantaneous transmitted signal and the received signal.

However, an acknowledged drawback of FMCW radar systems is that the velocity of the target (in other words the vehicle ahead) relative to the radar system affects the measured range. This is due to the fact that the velocity of the target relative to the radar antenna produces a frequency shift due to the Doppler effect which alters the frequency. The shift in frequency due to the Doppler effect alters the perceived range of the target and this phenomenon is called range-Doppler coupling.

One solution to the problem of range-Doppler coupling is to apply a modulating frequency envelope to the transmitted wave that both increases and decreases in frequency. The frequency shift on the received signal due to the Doppler effect will be positive for an approaching target and negative for a receding target regardless of the instantaneous direction of the radar frequency sweep, whereas the frequency shift due to the range of the target will alter in polarity with the direction of frequency sweep. The frequency shifts due to target range and the Doppler effect respectively can thus be distinguished. However, the use of a bi-directional frequency sweep in this manner increases the possibility of confusion between multiple targets.

An alternative solution is to measure the distance using an FMCW radar, derive the target velocity by differentiation of the distance signal (or beat frequency), and calculate the error due to range-Doppler coupling from the target velocity. This is difficult to achieve in practice, however, because small difference signals have to be derived from signals with large amplitudes and this is especially difficult to achieve successfully in a noisy environment such as a motor vehicle.

FMCW radar systems are frequently employed in control systems, for example the vehicle headway control system mentioned previously, which require an element of prediction. In a headway control system, allowance must be made for the delay in a vehicle's response to alterations in the amount of throttle applied to the engine.

FIG. 1 of the accompanying drawings shows a block schematic diagram of a prior art vehicle headway control system 10. A desired speed value DS is fed to a look-up table 12 to provide a desired headway DH signal (based on sensible stopping distances) to a control unit (CNTL) 14. The CNTL 14 is provided with a further three signals, namely a headway measurement HW, a relative velocity measurement RV and an estimated acceleration EA. The CNTL provides a control signal TC for controlling the rate of change to be applied to the vehicle throttle (not shown). The signal TC is also fed to an integrator 16 which includes a delay of a duration dependent upon the dynamics of the vehicle and which provides, in response to signal TC, the estimated acceleration signal EA to the CNTL 14. The headway signal HW is typically provided by a FMCW radar (not shown) and relative velocity RV derived by differentiating the headway signal. For the purposes of description, however the estimated acceleration signal EA is shown as being fed to another integrator 18. The integrator 18 provides an output signal SV representative of the velocity of the system to a subtracter 20 also shown for the purposes of description. A further input to the subtracter 20 is shown to be provided by the target velocity TV. The relative velocity RV between the headway control system and the vehicle ahead appears at the output of the subtracter 20 and is fed to the CNTL 14 and to a further integrator 22 shown for the purposes of description. The integrator 22 provides a value of the headway HW between the system and the vehicle ahead to the CNTL 14. The CNTL 14 is operable to adjust the rate of acceleration of the vehicle to equate the actual headway HW with the desired headway DH while taking estimated acceleration and relative velocity into consideration. The CNTL 14 may also be arranged to limit vehicle speed as measured, for example, by a radar speedometer to the value of desired speed DS.

A headway control system such as that described above requires a substantial amount of circuitry to provide the necessary prediction and careful setting-up to ensure stability.

SUMMARY OF THE INVENTION

It is an object of the present invention to provide a radar system which ameliorates the above disadvantages of range-Doppler coupling and control system complexity when using an FMCW radar system.

According to the present invention there is provided a radar system for predicting the range of a target moving relative to the radar system at a prediction time t seconds in the future, comprising means for repeatedly transmitting a signal at a frequency which sweeps upwards over time from a base frequency f Hertz at a rate r Hertz per second, means for receiving a return signal reflected by the target, mixing means for mixing the return signal with a signal representative of the transmitted signal to provide a difference signal, the difference signal having a frequency which comprises a component due to the range of the target from the radar system and a component due to the velocity of the target relative to the radar system, characterised in that for a predetermined base frequency f and prediction time t, the means for repeatedly transmitting a signal comprises means for sweeping the transmitted signal at a rate $r=f/t$ selected so that the component of the frequency of the difference signal due to the velocity of the target relative to the radar corresponds to the distance relative to the radar system which would be travelled by the target at that relative velocity in the prediction time t.

The present invention is based upon the appreciation that by providing means to sweep the frequency of the transmitted signal of an FMCW radar at a particular calculated rate, the undesirable effect of range-Doppler coupling in such a radar can not only be ameliorated but can actually be exploited to provide a prediction function. The radar provides prediction of the range of a target at a time t in the future by deliberately selecting a quantity of the Doppler shift due to the velocity of the target to be coupled into the range measurement. To provide a range prediction the frequency of the transmitted signal must sweep upwards. The length of the prediction time t, in other words the degree of prediction required, determines the amount of Doppler shift which is to be allowed to couple into the range measurements. This amount may be conveniently adjusted by altering the duration of the radar sweep; the longer the duration of the sweep the larger the prediction time and vice versa. The degree of prediction required for a cruise control in a typical car is around one second. The velocity of the target, or vehicle ahead, is unlikely to alter to a significant degree in so short a space of time so an accurate range prediction can be obtained.

By adjusting the coupling coefficient between range and Doppler frequency shifts of the radar in a control system, a feedback signal may be obtained that contains a given proportion of Doppler frequency shift. This proportion may be arranged to provide the requisite degree of velocity feedback required to stabilise the control loop, without the requirements of deriving a separate velocity signal, a further control loop or separate means for adjusting the degree of the velocity feedback.

The present invention also provides a cruise-control system which incorporates a radar system in accordance with the present invention. When the range signal determined by the radar system is below a predetermined threshold, means may be provided to apply vehicle brakes and/or to inflate a collision protection bag in front of the vehicle passengers.

The invention also relates to vehicle incorporating a cruise-control system and to a corresponding method of range determination.

BRIEF DESCRIPTION OF THE DRAWING

The present invention will now be explained and described, by way of example, with reference to the accompanying drawings, wherein.

DESCRIPTION OF THE PREFERRED EMBODIMENTS

Figure 1:
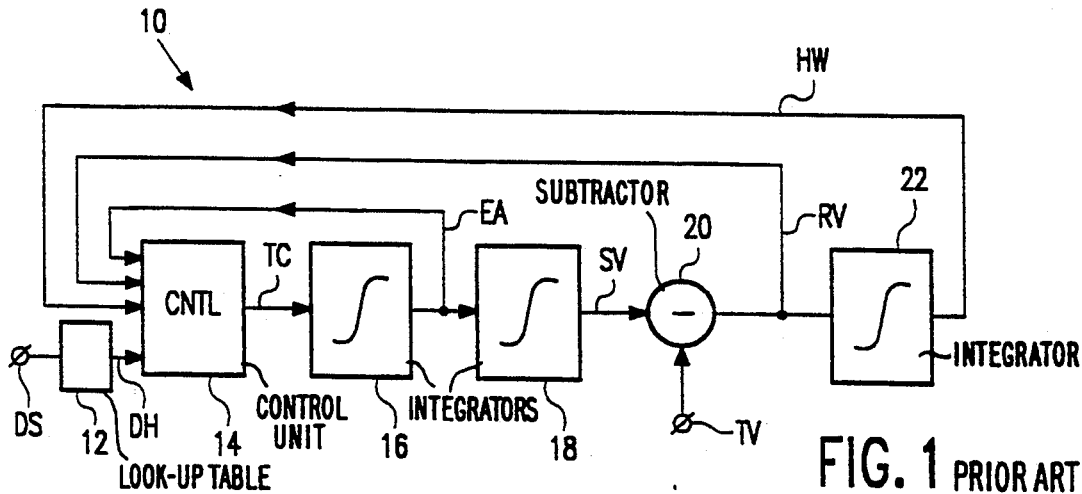
FIG. 1 shows a block schematic diagram of a prior art headway control system.
Figure 2:
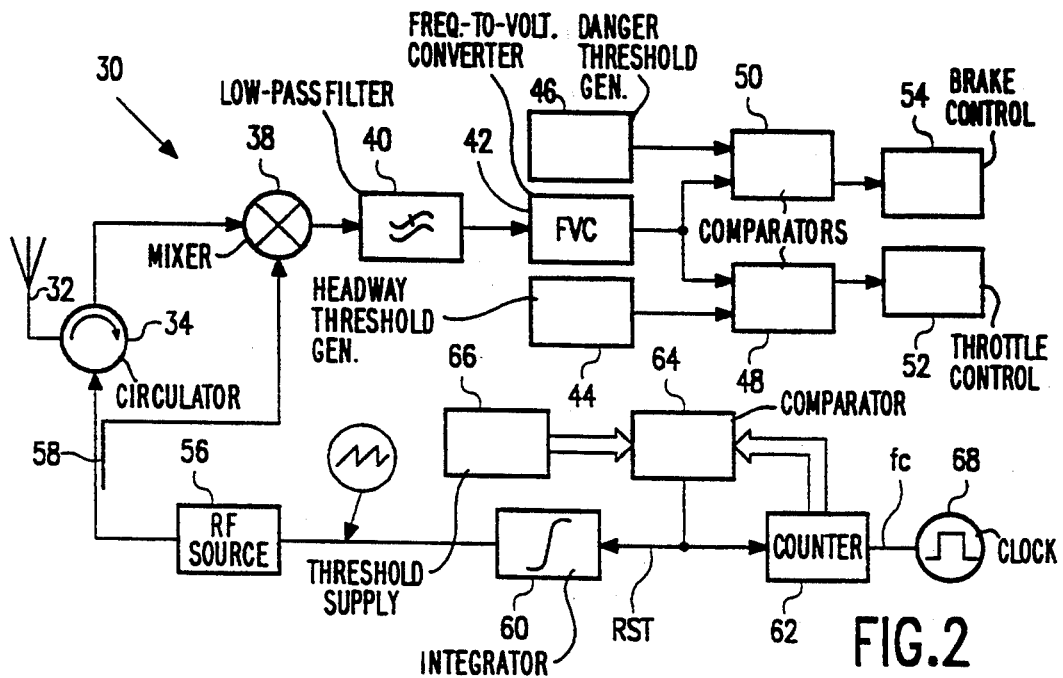
FIG. 2 shows a block schematic diagram of a cruise control system in accordance with the present invention.

FIG. 2 shows a cruise control system 30 incorporating a FMCW radar system in accordance with the present invention. A counter 62 is driven by a digital clock 68 having an output frequency $f_c$. An integrator 60 has an output connected to an R.F. source 56 to adjust the frequency of that source. An output of the R.F. source is connected to an antenna 32 via a circulator 34. An output of the counter 62 is connected to a first input of a comparator 64. A second input of the comparator 64 is connected to a threshold supply means 66 which may comprise a set of links to logic zero and logic one respectively. If the two inputs to the comparator 64 match then a reset signal (RST) connected to the counter 62 and to the integrator 60 goes high to reset the counter and the integrator. Alternatively, the reset signal for resetting the integrator 60 may be derived from an analogue comparator coupled to the output of the integrator. Techniques to linearise the sweep of the R.F. source may be employed as is known in the art.

A return signal is fed from the antenna 32 via the circulator to a first input of a mixer 38. A second antenna may be provided to receive the return signal and the circulator omitted. The second input of the mixer 38 is connected to the output of the R.F. source 56 via a directional coupler 58. The output of the mixer is connected to a low pass filter 40 to provide the difference signal of the mixing process. The difference signal is coupled to a frequency to voltage converter (FVC) 42 having a voltage output signal connected to a first respective input of a pair of comparators 48,50. A second input of the comparators 48,50 is connected to a headway threshold generator 44 and to a danger threshold generator 46 respectively. The output of comparator 48 is fed to a throttle control means 52 to provide a signal to accelerate the vehicle if the measured headway is less than the headway threshold and to decelerate the vehicle if the reverse situation occurs. The headway threshold may be set to a value appropriate to the vehicle speed which speed may be controlled automatically in known manner. The output of comparator 50 is connected to a brake control means 54 to provide a signal to apply the vehicle brakes if the measured headway is less than a danger level. Such a signal may conveniently be coupled to an anti-lock braking system.

The radar parameters are determined as follows. The frequency of operation of the radar, or base frequency, f is selected. This is determined, as is known, by factors such as permission to use the space in the frequency spectrum and limits on the size of the radar antenna(s). 80 GHz is a suitable frequency for automotive radar applications. The range resolution required determines the sweep excursion, for example a range resolution of 1 meter at this frequency requires a sweep excursion of 150 MHz. This is adjusted in the system of FIG. 2 by the size of the threshold provided by the means 66 which threshold is equal to the input required to the integrator 60 to cause a 150 MHz change in the frequency of the VCO 56. The prediction time, or later time at which the range measurement is desired, is one second. The sweep rate r required is equal to the base frequency f divided by the time t as stated previously and so is equal to 80 GHz per second. Each sweep excursion is 150 MHz so there must be $8 \times 10^{10}/1.5 \times 10^8$ sweeps per second or a sweep rate of approximately 533 Hz.

The reasoning behind the predictive operation of the radar system is as follows.

For an FMCW radar:

The beat frequency due to the target distance, $$f_{range} = \frac{2rs}{c} \quad (1)$$

where
r=sweep rate (Hz/s),
s=target range (m), and
c=speed of light (m/s)

$$s = \frac{f_{range} \cdot c}{2r} \quad (2)$$

The beat frequency due to target velocity relative to the radar, $$f_{doppler} = 2\frac{V}{c} \cdot f \quad (3)$$

where
f=base frequency (Hz), and
V=target velocity (m/s)

Substituting $f_{doppler}$ from (3) into (2) as the value for $f_{range}$ gives the error in the range calculation due to the target velocity, $$s_{doppler} = \frac{c}{2r} \cdot \frac{2V}{c} \cdot f = \frac{Vf}{r}$$

The time t at which the target distance is equal to the range output of the radar, is given by the range error divided by the target relative velocity, which gives:

$$t = r/f$$

f is the base frequency which is usually fixed by radio spectrum or system size constraints, as mentioned above.

t is the prediction time which is desired to be a certain value dependent upon the application.

$$r, \text{ the sweep rate} = \frac{\text{sweep excursion}}{\text{sweep duration}} \text{ (definition)}$$

The sweep excursion is defined by the desired accuracy of the radar system so the sweep duration must be selected to provide the correct value of t for the application.

$$t = \frac{f \cdot \text{sweep duration}}{\text{sweep excursion}}$$

therefore $$\text{sweep duration} = \frac{t \cdot \text{sweep excursion}}{f}$$

In operation a signal to be transmitted is provided by R.F. source 56 which is arranged to be driven by a sawtooth waveform of ascending voltage ramps by the resettable integrator 60. The counter 62 counts the pulses supplied by the clock 68 until the count reaches the threshold value provided by the means 66. The comparator 64 detects that the threshold has been reached and resets the counter 62 and integrator 60. The rate of transmitted frequency increase is adjusted by setting a fixed level input to the integrator 60 and the clock rate together with the threshold determine the extent of the frequency excursion. The sweep repetition rate is then given by the clock rate divided by the threshold value.

The circulator 34 passes signals to be transmitted to the antenna 32 and return signals to the mixer 38. A proportion of the signal currently being transmitted is mixed with the received signal and filtered to provide the difference or beat signal. The frequency of the difference signal is converted to a voltage in FVC 42 and compared at 48,50 with two thresholds, a headway threshold and a danger threshold. If the headway is too great or too small the comparator 46 sends a signal to the throttle control 52 to adjust the vehicle's position relative to the one preceding it. The comparator 46 may also be provided with an overall speed limit and velocity information from the vehicle's speedometer to ensure that speed limits are complied with. If the predicted headway falls to a certain critical value provided by the means 46 the system is operable to provide a signal to apply the vehicle brakes via the brake controller 54. The value of headway at which the brake is applied can be made dependent upon vehicle speed.

In the interests of simplicity of description a bang-bang control system has been described which incorporates a radar system in accordance with the present invention. It will be appreciated by those skilled in the art that other control systems, for example linear proportional control systems, could be used with such a radar system.

Figure 3:
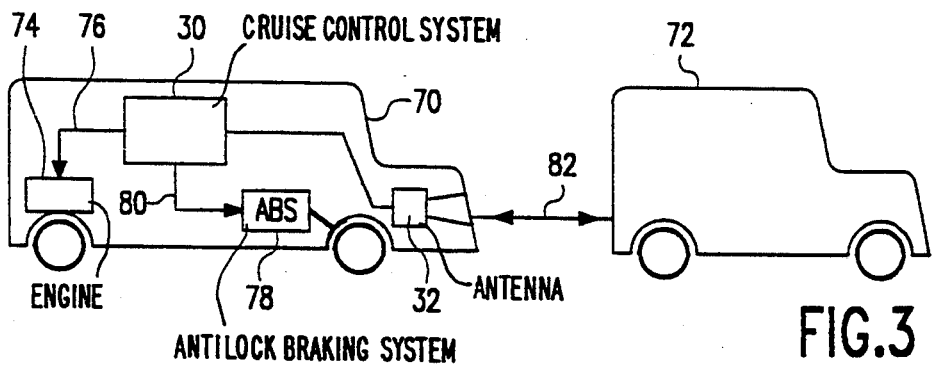
FIG. 3 shows a block schematic diagram of a vehicle incorporating a cruise-control system.

FIG. 3 shows a diagram of a vehicle 70 incorporating the cruise-control system of FIG. 2 following a preceding vehicle 72. The vehicle 70 contains a propulsion means, or engine 74 having a control input 76 and an antilock braking system (ABS) 78 having a control input 80. The antenna 32 of a cruise-control system 30 is located at the front of the vehicle and a bi-directional signal path between the antenna and the vehicle 72 is shown at 82. The control signal 76 is provided by the means 52 (FIG. 2) and the control signal 80 is provided by the means 54 (FIG. 2). The vehicle 70 also has manual controls (not shown) for the engine and ABS to enable a vehicle driver to override the cruise-control system.

The radar system in accordance with the present invention may be used to provide velocity feedback to stabilise a control loop. The signal provided by the radar inherently includes a component dependent upon target velocity and the degree of coupling between the frequency shift due to range measurement and the frequency shift caused by the Doppler effect may be adjusted to provide the required amount of frequency feedback. If the sweep rate of the radar is increased (which also increases the range resolution if the sweep duration is not reduced accordingly) the relative effect of the velocity dependent component of the frequency shift at the radar output will be reduced and the degree of prediction is reduced, and vice versa. The degree of velocity feedback may be calculated using the equation given previously.

The radar system in accordance with the present invention may be implemented by a baseband quadrature receiver which may be provided as an integrated circuit.

From reading the present disclosure, other modifications will be apparent to persons skilled in the art. Such modifications may involve other features which are already known in the design, manufacture and use of FMCW Radar Systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. Vehicular apparatus including a radar system for predicting the range of a target relative to the radar system at a prediction time t seconds in the future, said apparatus comprising:
   a. means for transmitting a signal at a frequency which repeatedly sweeps from a base frequency f at a rate r=sweep excursion/sweep duration;
   b. means for receiving a return signal reflected by the target;
   c. mixing means for mixing the return signal with a signal representative of the transmitted signal to provide a difference signal, said difference signal having a frequency which comprises a component due to the range of the target from the radar system and a component due to the velocity of the target relative to the radar system;
   said means for transmitting a signal including means for sweeping the transmitted signal at a rate r=f/t such that the component of the frequency of the difference signal due to the range of the target accurately represents the distance relative to the radar system at the prediction time t even if the target is moving relative to the radar.

2. Vehicular apparatus as in claim 1 where the prediction time t is substantially equal to a response delay of the vehicle and where the apparatus includes means for producing a range signal representative of the target range, means for providing a desired headway signal, means for comparing the range signal with the desired headway signal to provide a difference signal, and means responsive to the difference signal to provide a signal for use in adjusting the speed of the vehicle.

3. Vehicular apparatus as in claim 2 including means responsive to the range signal to provide a vehicle braking signal if the range is less than a predetermined value.

4. A vehicular apparatus as in claim 2 or 3 including means responsive to the range signal to produce a signal for effecting activation of a collision protection bag if the range is less than a predetermined distance.

5. A method for predicting the range of a target relative to a vehicle at a prediction time t seconds in the future, said method comprising:
   a. transmitting a signal at a frequency which repeatedly sweeps from a base frequency f at a rate r=sweep excursion/sweep duration;
   b. receiving a return signal reflected by the target;
   c. mixing the return signal with a signal representative of the transmitted signal to provide a difference signal, said difference signal having a frequency which comprises a component due to the range of the target from the radar system and a component due to the velocity of the target relative to the radar system;
   said transmitted signal being swept at a rate r=f/t such that the component of the frequency of the difference signal due to the range of the target accurately represents the distance relative to the vehicle at the prediction time t even if the target is moving relative to the vehicle.

* * * * *